US007694752B2

(12) United States Patent
Daniel et al.

(10) Patent No.: US 7,694,752 B2
(45) Date of Patent: Apr. 13, 2010

(54) DRY DRILLING

(75) Inventors: Gerald A. Daniel, Cumbria (GB); Brent Broadhurst, Leigh (GB); James Harken, Cumbria (GB); Colin Robson, Cumbria (GB)

(73) Assignee: British Nuclear Fuels PLC, Chesire (GB)

( * ) Notice: Subject to any disclaimer, the term of this patent is extended or adjusted under 35 U.S.C. 154(b) by 49 days.

(21) Appl. No.: 10/563,710

(22) PCT Filed: Jul. 5, 2004

(86) PCT No.: PCT/GB2004/002916

§ 371 (c)(1),
(2), (4) Date: Oct. 10, 2006

(87) PCT Pub. No.: WO2005/005097

PCT Pub. Date: Jan. 20, 2005

(65) Prior Publication Data

US 2007/0065241 A1 Mar. 22, 2007

(30) Foreign Application Priority Data

Jul. 8, 2003 (GB) ................... 0315944.9

(51) Int. Cl.
*E21B 7/28* (2006.01)
*E21B 10/60* (2006.01)

(52) U.S. Cl. ............................ 175/71; 175/53; 175/385

(58) Field of Classification Search ................. 175/53, 175/71, 334, 385; 299/55, 56
See application file for complete search history.

(56) References Cited

U.S. PATENT DOCUMENTS

| 2,702,180 | A | * | 2/1955 | Horner ......................... 175/69 |
| 2,930,586 | A | * | 3/1960 | Long ............................ 175/57 |
| 3,083,779 | A | * | 4/1963 | Rowley ........................ 175/107 |
| 3,537,518 | A | * | 11/1970 | Sullivan et al. ................ 166/64 |
| 4,134,463 | A | * | 1/1979 | Allen ........................... 175/53 |
| 4,354,560 | A | * | 10/1982 | Johnson ...................... 175/267 |
| 5,580,188 | A | * | 12/1996 | Nowak ......................... 405/184 |
| 6,729,418 | B2 | * | 5/2004 | Slaughter, Jr. et al. ......... 175/53 |
| 2001/0050186 | A1 | | 12/2001 | Wilson et al. ................. 175/38 |
| 2002/0108785 | A1 | * | 8/2002 | Slaughter et al. .............. 175/53 |

FOREIGN PATENT DOCUMENTS

GB  2 084057  4/1982
WO  03/002320  9/2003

OTHER PUBLICATIONS

International Search Report for PCT/GB2004/002916 w/Written Opinion Attached.

* cited by examiner

*Primary Examiner*—Shane Bomar
(74) *Attorney, Agent, or Firm*—Myers Bigel Sibley & Sajovec

(57) ABSTRACT

A method and apparatus for drilling a bore through a target includes advancing a drill bit into the target along a direction of advancement and injecting a directing gas in the direction of advancement through at least one aperture in the drill bit. As the bore is drilled, waste material is directed in the direction of advancement via the gas.

17 Claims, 10 Drawing Sheets

DRY DRILLING

RELATED APPLICATIONS

The present application is a 35 U.S.C. §371 national phase application of PCT International Application No. PCT/GB2004/002916, having an international filing date of Jul. 5, 2004, and claiming priority to Great Britain Patent Application No.0315944.9, filed Jul. 8, 2003, the disclosures of which are incorporated herein by reference in their entireties. The above PCT International Application was published in the English language and has International Publication No. WO 2005/005097 A1.

BACKGROUND

1. Field of the Invention

The present invention relates to a method and apparatus for drilling through a target. In particular, but not exclusively, a bore is drilled through a target ensuring that waste material associated with the drilling process is directed in the direction of advancement of the drill.

2. Related Art

Many drilling techniques and apparatus are known in the prior art. Commonly a drive unit comprising a motor is used to rotate a drill bit at high speeds. The drill bit includes a cutting tip which cuts into a target as the drill is urged against the target. The drill bit may include rifling or other grooves which draw waste material, commonly known as swarf back out of the hole away from the cutting face where the front tip of the drill bit engages the target.

A number of problems are known with such drilling processes. One such problem is that when drilling through a target formed of a particularly hard material a great deal of heat is generated. Often a liquid coolant is used to lubricate the drilling process to prevent overheating. A problem with the use of liquid lubricant is that it can itself cause a hazard and can therefore require further steps to remove liquid.

Another problem with known drilling processes occurs when a target includes multiple materials each providing different physical properties when a bore is drilled through them. For example when drilling through a concrete wall which has pre-existing pipe work extending through it drilling out the metal pipe work and concrete can cause snagging. This is particularly true when drilling through large widths of wall for example through a number of meters in which case the force required to urge the drill bit through the wall can be prohibitive and/or snagging can make the process difficult.

It is also known that in certain hazardous areas drilling a hole through a wall to access that area has many peculiar problems associated with it. For example it is well known in the nuclear industry to have rooms, commonly known as cells in which radioactive waste is processed or generated. Under these circumstances the room is formed with thick walls and any breach of these walls could potentially cause an outward motion of radioactive or other hazardous material from the cell into an adjacent area. This should be avoided. Under these circumstances if a hole is to be drilled to provide access to the potentially dangerous zone care must be taken that waste material does not move from the cell to the adjacent region. In addition all potentially contaminated material including waste material from the drilling process and drill tips which have potentially come into contact with hazardous material must be collected within the dangerous zone for subsequent safe removal rather than being returned into a "safe" region where a drill is situated. Under these circumstances conventional drilling apparatus and methods do not provide a satisfactory system.

It is an aim of the present invention to at least partly mitigate the above-mentioned problems.

SUMMARY OF EMBODIMENTS OF THE INVENTION

According to a first aspect of the present invention there is provided a method for drilling a bore through a target comprising the steps of:

advancing a drill bit into said target along a direction of advancement; and injecting a directing gas in the direction of advancement through at least one aperture in said drill bit; whereby as said bore is drilled waste material is directed in the direction of advancement via said gas.

According to a second aspect of the present invention there is provided a drill bit for drilling a bore through a target via a drilling process, comprising:

at least one cutting element arranged to cut a bore having an internal diameter through said target as said drill bit advances into said target; and at least one aperture in said drill bit for permitting a directing gas to be injected in a direction of advancement of said drill bit to thereby direct waste material, formed as said bore is drilled, in said direction of advancement.

According to a third aspect of the present there is provided a drill, for use with a drill bit arranged for drilling a bore through a target, comprising:

a rotor shaft arranged to rotate when driven;

a motor arranged to drive said shaft;

connection means for connecting said drill bit to said rotor shaft;

a gas inlet arranged to receive pressurised gas from a pressurised gas source; and gas directing means arranged to inject gas from the inlet to said drill bit thereby providing a directing gas flow in a direction of advancement as said drill bit drills said bore.

Embodiments of the present invention can drill a hole or more accurately a bore through a target material by using a directing gas as a coolant. This reduces the unwanted effects produced by using liquid coolant. In addition by injecting gas in a direction of advancement of the drill bit during drilling waste material, formed as the drill tip advances through the target, can be directed away from the entry point of the drill bit along the line of advancement and into a region on a further side of the target.

Embodiments of the present invention provide the advantage that when pipe work extending through a target wall pre-exists a drilling process can take place to remove the pipe work material and possibly further extend the diameter of the existing bore through the target. This can provide the possibility to introduce further pipe work through a target or possibly further items.

BRIEF DESCRIPTIONS OF THE DRAWINGS

Embodiments of the present invention will now be described hereinafter, by way of example only, and with reference to the accompanying drawings in which.

Figure 7A:
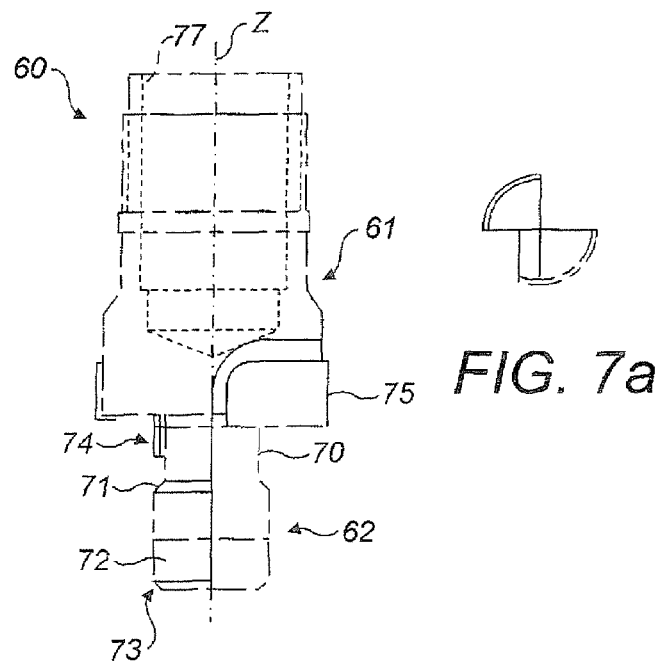
Figure 7B:
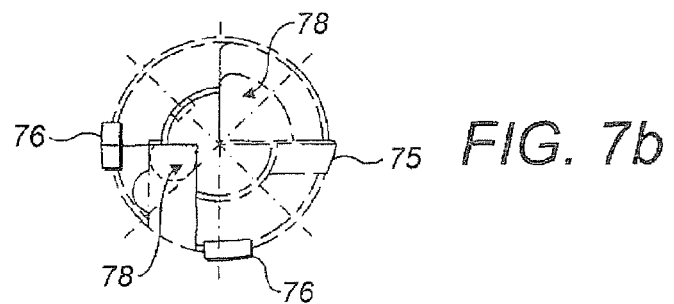
Figure 7C:
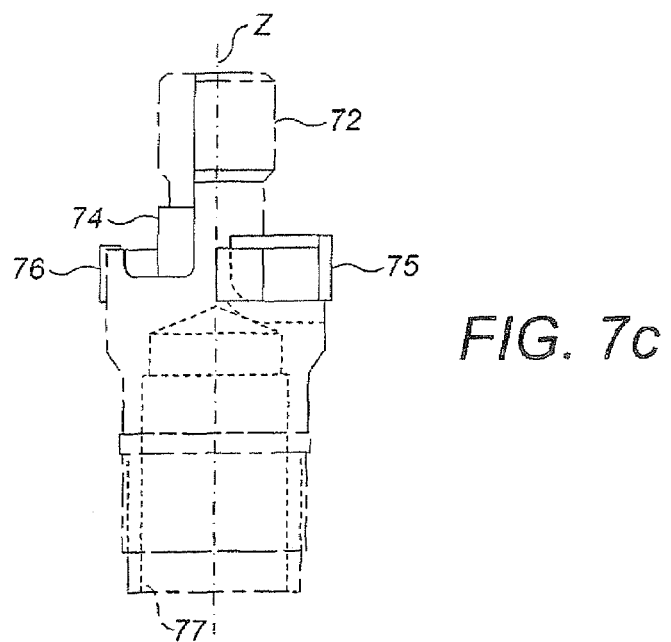
Figure 8A:
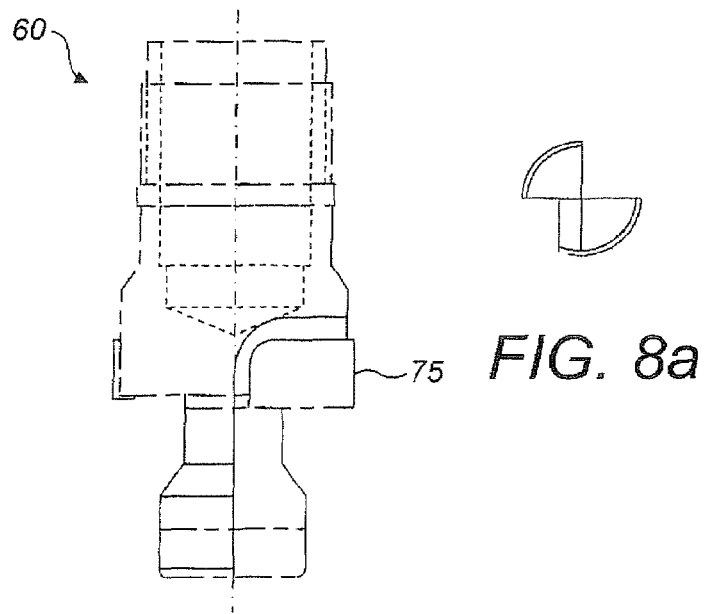
Figure 8B:
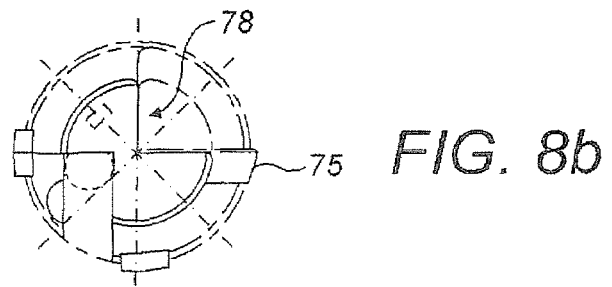
Figure 8C:
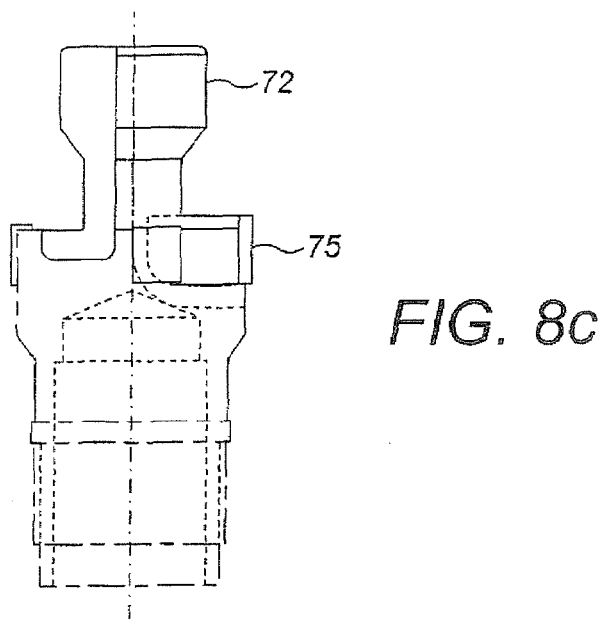
Figure 9:
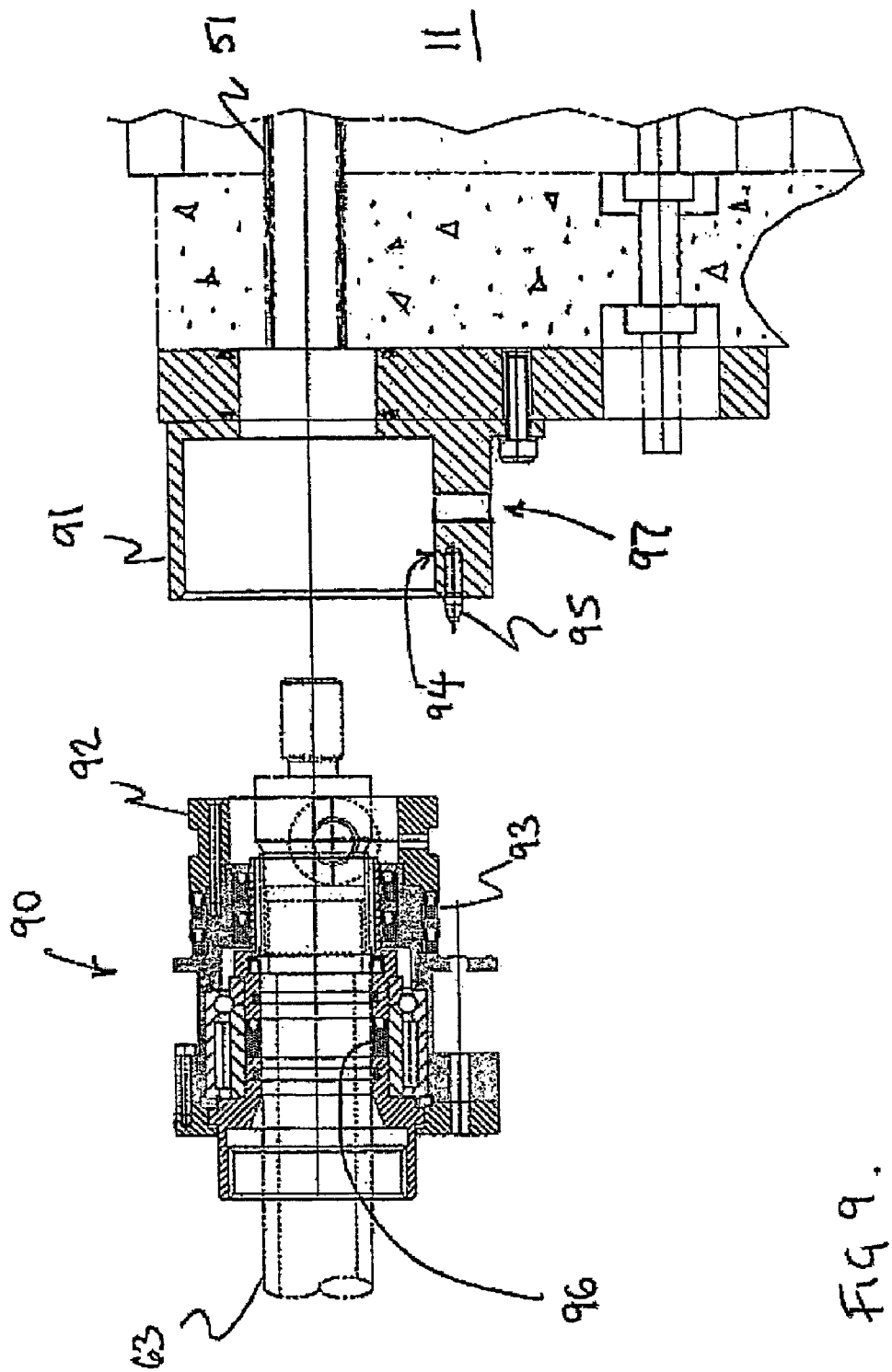

FIGS. 7*a*, 7*b* and 7*c* illustrate a drill tip;

FIGS. 8*a*, 8*b* and 8*c* illustrate a drill tip;

FIG. 9 illustrates an approach of a drill tip to a target; and

Figure 10:
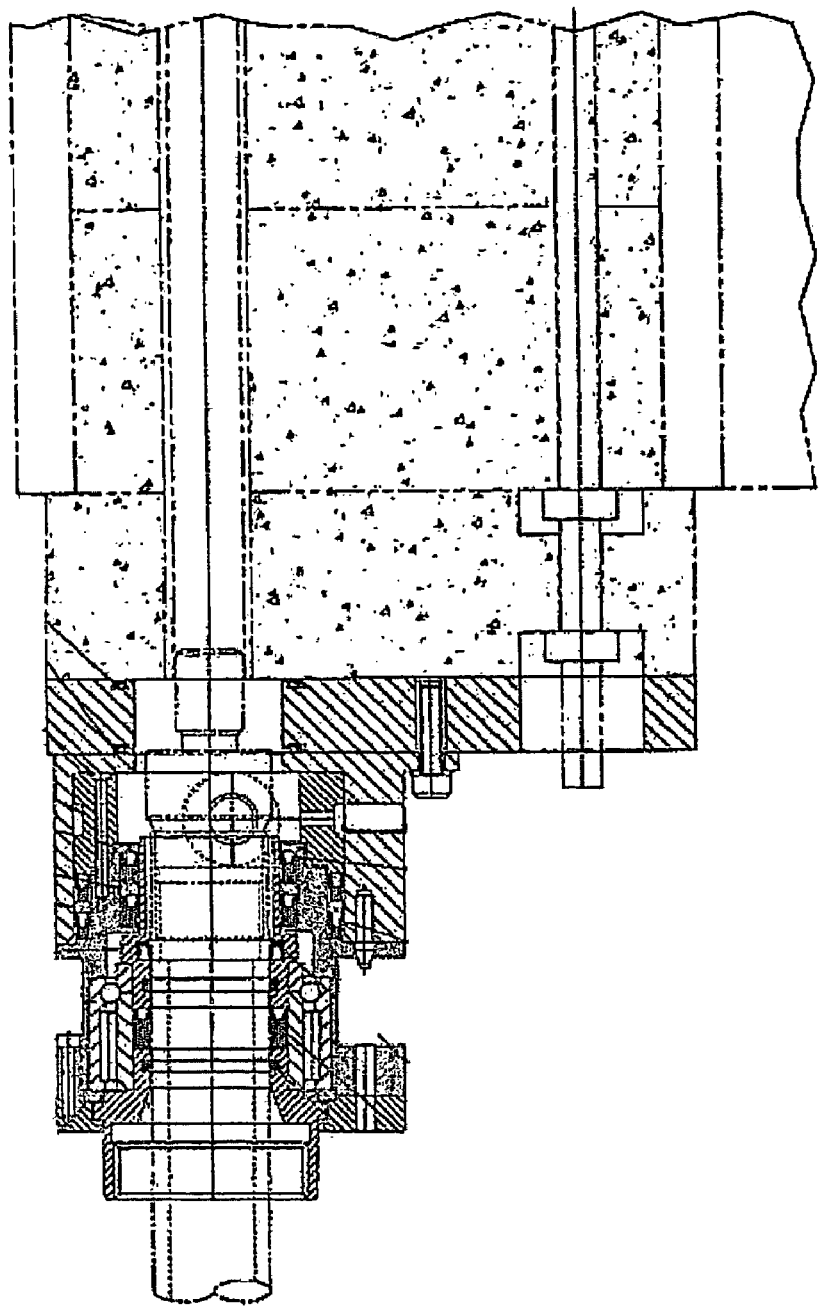

FIG. 10 illustrates the position of the drill tip and target immediately prior to drilling.

DESCRIPTION OF EMBODIMENTS ACCORDING TO THE INVENTION

In the drawings like reference numerals refer to like parts.

Figure 1:
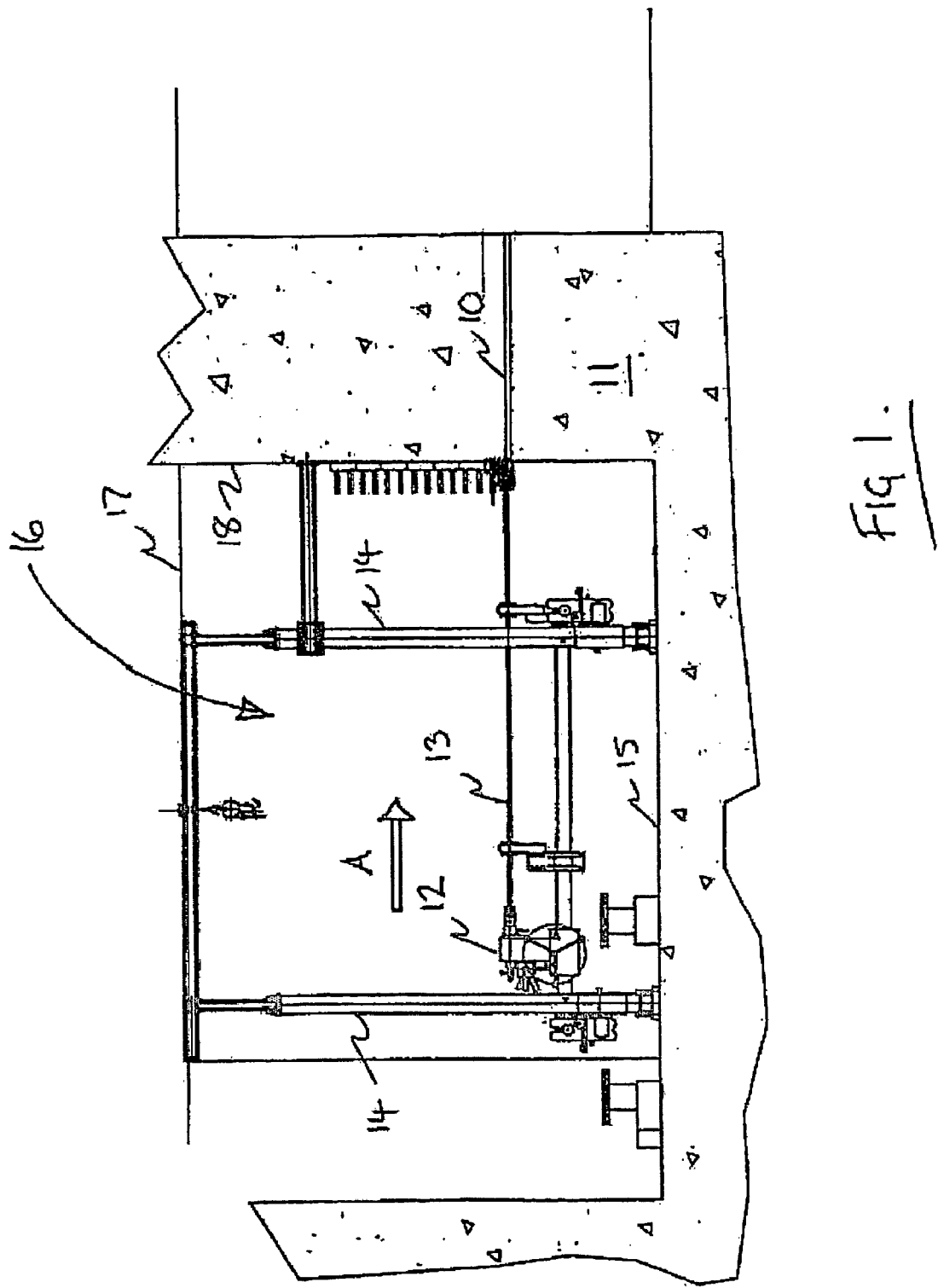
FIG. 1 illustrates drilling apparatus.

FIG. 1 illustrates how a drilling process may be used to drill a bore 10 through a thick wall 11 having a pre-existing bore. The bore is a pre-existing pipe which extends through the wall 11 although it will be understood that the bore could be a predrilled hole through the target. A drill 12 is arranged to drive a drill bit 13 in the direction of arrow A. As the drill bit is advanced into the target 11 a bore is developed through the target. The drill 12 is supported by a framework of posts 14 which may be secured to the floor 15 of a room 16. The framework support may also be secured to other portions of the room for example to the ceiling 17 and/or wall face 18 by way of respective securing fasteners.

Figure 2:
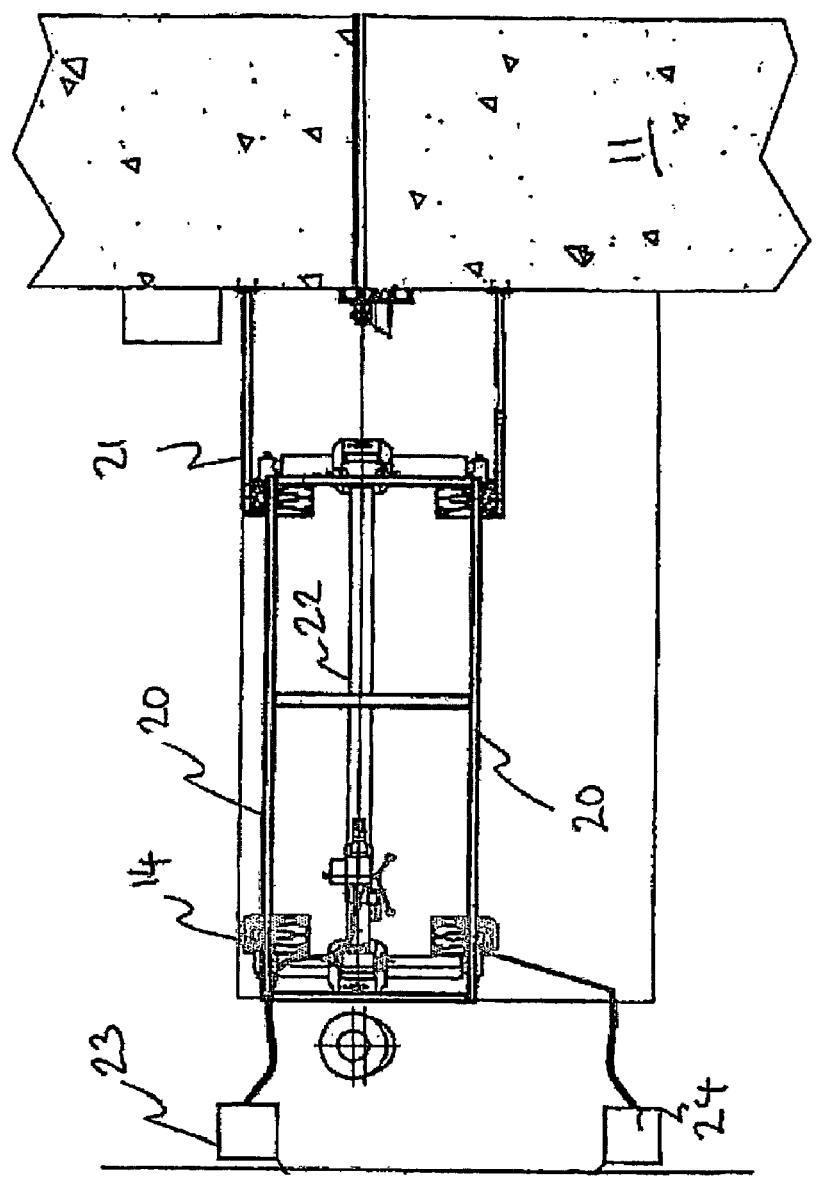
FIG. 2 illustrates a top view of drilling apparatus.

As may be seen in FIG. 2 which illustrates the drilling apparatus of FIG. 1 from above the support further includes cross pieces 20 connecting the posts 14 and connecting beams 21 for securing the framework to the wall 18. It will be understood that the framework of uprights 14 and cross pieces 20 and beams 21 are used to provide a rigid support for a driving beam 22 along which the drill 12 is advanced. Such a framework is advantageous when a particularly long bore 10 is being formed or when precise drilling is required. It will be understood that if a bore is to be drilled which is only a few centimeters long or where great precision is not required then the drill and appropriate drill bit may be held manually by a user without the need for a supporting structure. Other supporting structures may also be used.

A hydraulic system 23 is provided to power the drill 12. Other power sources could of course be used. A compressed air supply 24 is used to provide a gas supply to the drill. The gas may be used either as a coolant or as a mechanism by which waste material formed during the drilling process can be directed along the direction of advancement A as the drill bit 13 is driven through the target 11. Alternatively the gas can serve both purposes. The gas may be air.

Figure 3:
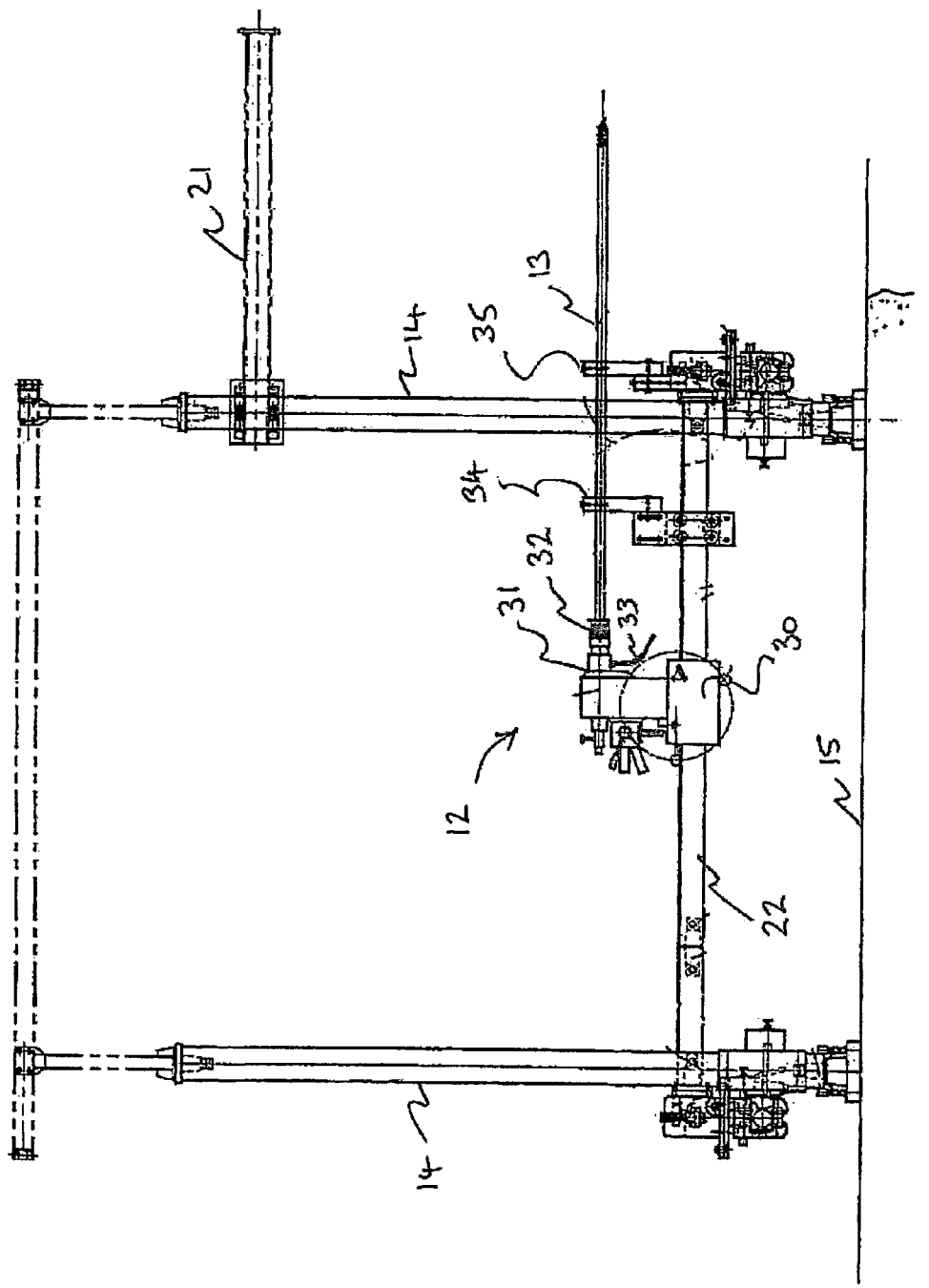
FIG. 3 illustrates a drill and support mechanism.

FIG. 3 illustrates the framework formed of upright post 14 and beams in more detail together with the drill 12 and drill bit 13. The drill 12 includes a sliding support 30 which holds the body 31 of the drill. The sliding body portion 30 is arranged to be driven longitudinally along the beam 22 whereby the drill bit 13 can be urged against the target 11 as the drill is advanced control of this advancement may be carried out remotely by users in another room with progressed monitored via various sensors and/or cameras. The drill bit 13 is connected to the body portion of the drill by a connecting member 32 so that as the motor of the drill is activated the drill bit 13 may be driven at high speed (or indeed any other selected speed). A compressed air 33 is provided to input a flow of gas which can act as coolant and/or directing gas. The directing gas flows through the body of the drill 31 and the connecting member 32 and down the longitudinal length of the drill bit 13 as will be described hereinafter. Further supports 34 and 35 are provided to help ensure that the drill bit is advanced in a desired direction when an accurate drilling process is required.

Figure 4:
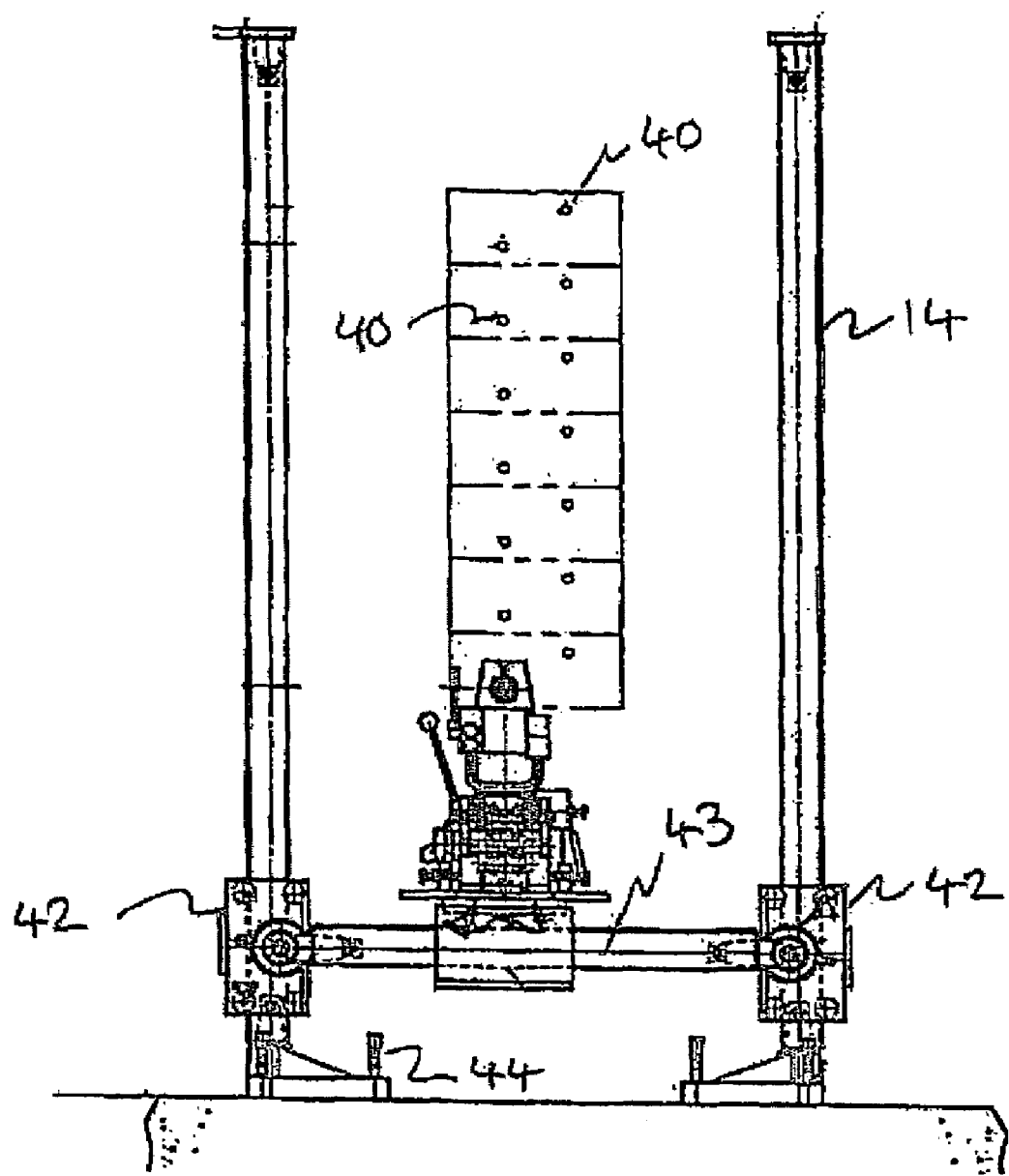
FIG. 4 illustrates a drill, support mechanism and possible target.

FIG. 4 illustrates a rear view of the drill 12 and framework. Also shown is a portion of the target 11 which may already have existing pipe work extending therethrough. In FIG. 4 the end holes 40 of these pipes are illustrated in a staggered formation of two columns. The drill 12 is advanced in a forward direction into the page along beam 22 during operation. Initially one of the holes 40 nominated as a target hole 41 (not shown) is selected and then the location of the beam 22 is adjusted by raising and/or lowering the beam 22 by virtue of the adjustable runners 42 on the upright post 14. Likewise the beam 22 may be adjustably located by sliding it horizontally along the beam 43 until a desired location is reached. Once correctly aligned all adjustments may be rigidly secured.

It will be understood that when great precision is required for the drilling process the angle of attack of the drill bit may be carefully selected either by eye or by some form of conventional laser guidance system. When less precision is required, as noted above, the framework will not need to be rigidly secured to the floor by securing pegs 44 and indeed the whole framework may be needless. Fixing the drilling machine carriage to thereby rigidly mount it helps to absorb reaction loads from the drilling process.

Figure 5:
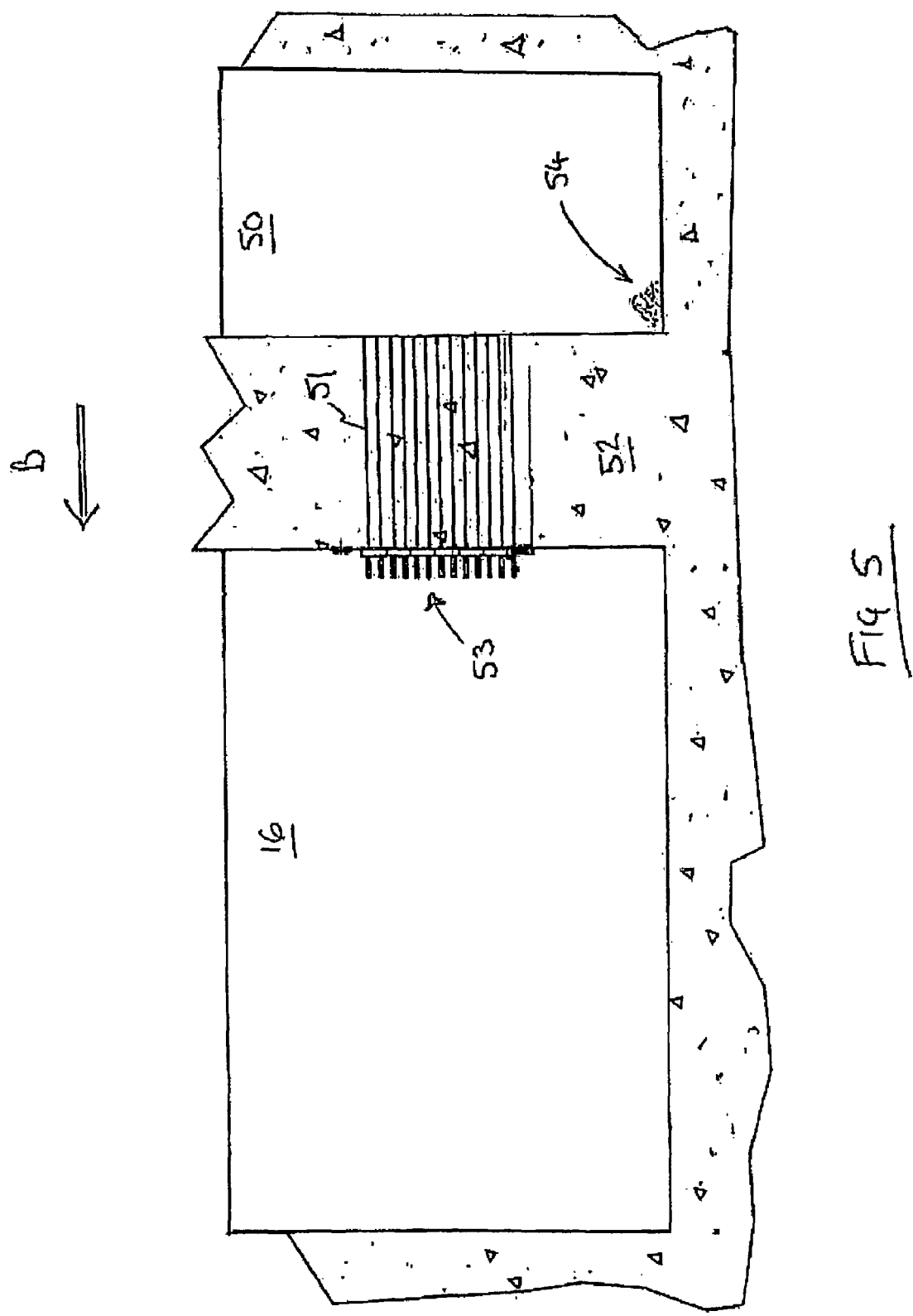
FIG. 5 illustrates a cell and adjacent safe region.

FIG. 5 illustrates one particular environment in which embodiments of the present invention may be used. It will be understood that the present invention is not restricted to use under such circumstances. As illustrated in FIG. 5 a first room 16 may be provided adjacent to a further room 50. The room 50 provides a hazardous environment and may as such contain radioactive material or biologically hazardous material. Access to the region 50 is therefore strictly controlled and operations which may be carried out therein severely restricted. Access to the region 50 to human users may be prohibited. Many such regions 50 are known for example a vitrification region where radioactive material is processed according to the AVM (atelier de vitrification marcoule) process. In such environments access is often provided for liquid flow into the region 50. Such liquid flow, which may be water flow, is provided by pre-existing pipes 51 extending through a safety wall 52. The pipes 52 have ends 53 extending into the room 16. It is known that on occasion these pipes must be replaced either because damage has been done to them or because a greater diameter of pipe is later required. Alternatively items may be required in the chamber 50 which cannot otherwise be accessed in which case these may be passed through a drilled out hole and then later the hole may be filled. Embodiments of the present invention provide a manner in which this can be done.

In the dangerous environments described above it is essential that no material existing in the region 50 travels in the direction B during removal/replacement of the pipes 51. This is because any contamination from the hazardous region 50 which reaches area 16 can prove harmful and/or fatal to users in that region. For this reason it is essential that any waste material which is formed as these pipes 51 are drilled out, and which includes any elements of the drill and drill bit which come into contact with contaminated material, are deposited in region 50 subsequent to the drilling process. As a new bore or bores are drilled through the wall 52 thereby removing the existing pipe work, waste material 54 may be collected on the floor of the chamber 50. This waste material 54 may be collected by equipment already existing in the chamber 50 and removed in a safe manner as will be appreciated by those skilled in the art.

Figure 6:
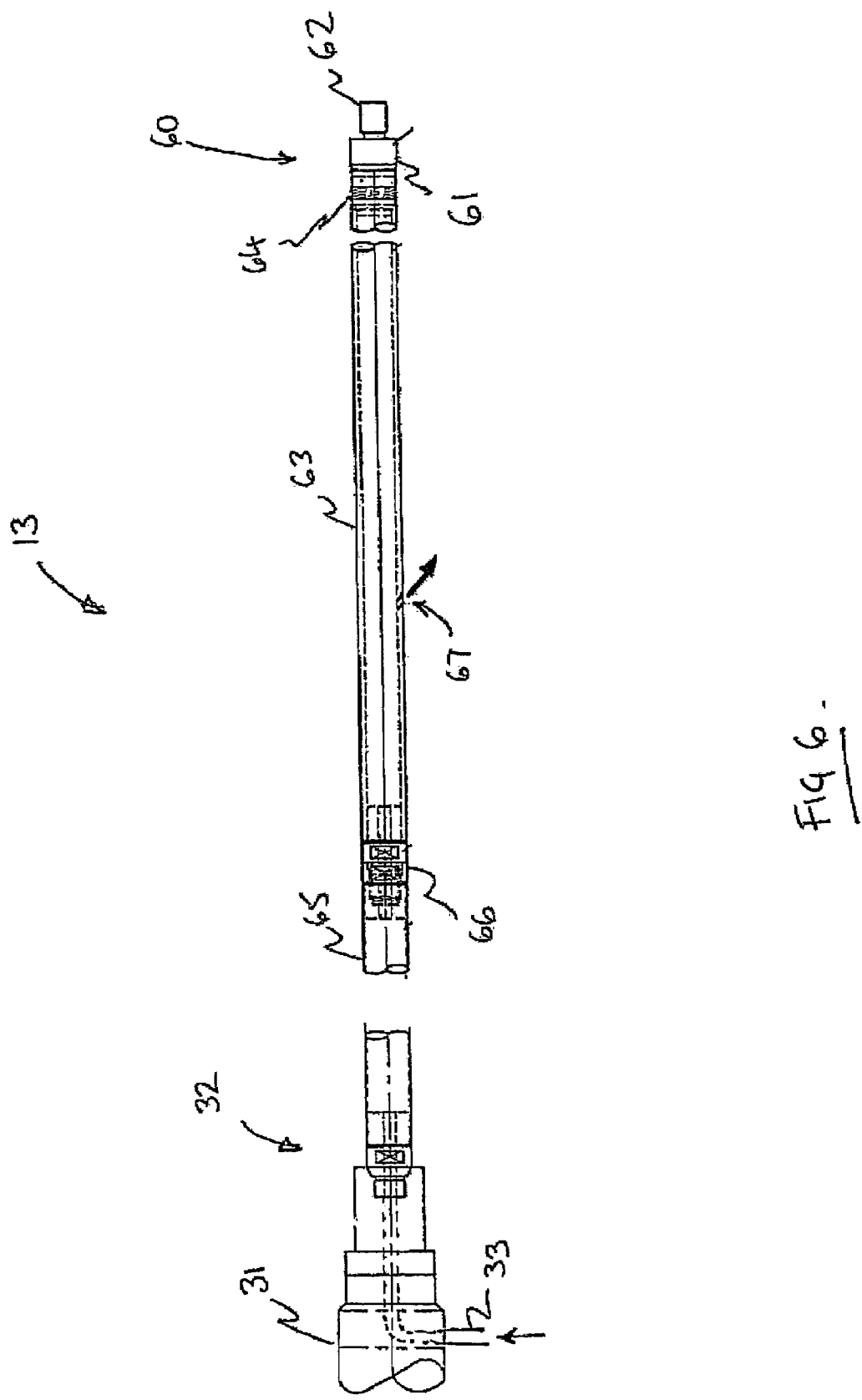
FIG. 6 illustrates a drill bit.

FIG. 6 illustrates a drill bit 13 which may be used in accordance with embodiments of the present invention. The drill bit includes a drill tip 60 which includes a body portion 61 and pilot tip 62. The drill tip is connected to a forward shaft portion 63 via connection 64 which may be a screw thread or snap fill connector. A rear shaft portion 65 is connected to the forward shaft portion 63 by a connector 66. The rear end of the rear shaft portion 65 is connected to the connector 32 which connects the drill bit 13 to the drill body 31. When the drills operated a drive shaft of the drill (not shown) is caused to rotate and the drill bit 13 is coupled to this shaft to rotate therewith. Rotation of the drill bit may be controlled to rotate slowly or rapidly at selected periods of the drilling process as will be understood by those skilled in the art.

Each of the rear and forward shaft portions 65 and 63 respectively is formed from a rigid cylindrical shell being substantially hollow inside. In this way a directing gas may be introduced at inlet 33 and is directed via a duct into the shaft 13. The connector 66 has a duct passing through it which enables air flow from the rear to the forward portion of the shaft. The air flows through the shaft and may be output through forwardly extending holes in the drill bit body 61 as will be described hereinafter in respect of FIGS. 7 and 8. Alternatively a hole or holes may be formed in the forward region of the shaft 13. These holes 67 (one shown in FIG. 6) may be formed themselves radially outwardly, or in a forwardly, extending direction so that air ejected therefrom is directed in a forward direction of motion along the direction of advancement of the drill bit. Air ejected from the drill bit body and/or pilot tip 62 directs waste material cut by cutting teeth of the drill bit in a forward motion as the drill bit is moved forward and the bore is developed in the target. Air emitted through the hole/holes 67 will be directed forwardly through a gap between the outer surface of the shaft 63 and the inner surface of the bore developed in the target by the cutting teeth elements of the drill bit. Both these processes will contribute to the movement of any waste material in a forward direction and thus into a region where hazardous material should be kept. Substantially no material will move in a rearward motion into the region 16 which is to be kept clean.

FIG. 7 illustrates views of a drill tip 60. The drill tip includes a pilot tip 62 and body portion 61. The pilot tip extends forwardly from the body portion 61 and has a narrow neck region 70 which extends outwardly in a conical neck region 71 to a pilot tip body 72. The pilot tip body has an outer diameter which is selected to match the internal diameter of a pipe which is to be bored out of a target. As the drill tip 60 is advanced along the pipe work the pilot tip 62 and in particular the pilot tip body 72 slides along the inside of the pipe thus determining how the drill bit as a whole advances. The body portion 72 of the pilot tip has a forwardly extending chamfered region 73 which helps ingress of the pilot tip along the pipe and prevents snagging. The neck region 70 of the pilot tip may be connected to the body portion 61 by some screw thread or other connecting means or may be more preferably be integrally formed with the rest of the drill tip. A cutting tooth 74 is provided which may be hardened so as to begin the cutting process as the drill tip is advanced into a target.

The body portion 61 of the drill tip includes further cutting teeth 75 and 76. The radially most outwardly extending edges of these teeth 75 and 76 which extend the most from the longitudinal axis Z define the inner diameter of the bore which is drilled through the target as the drill bit is advanced. Chip breaker tips may be used which include a groove machined horizontally a short distance back from a cutting edge. This helps break up swarf which is cut from the target as the swarf comes into contact with the groove. The swarf particle size, that is the greatest cross-section of any produced swarf particle, is controlled by selecting the distance between the cutting edge and groove formed in the drill tip. It will be understood that the profile of the hardened drill teeth 75 including grooves located horizontally a short distance back from the cutting edge determine chip breaking characteristics of the drill bit 60. These chip breaking characteristics determine that consistent particle size of waste material which is drilled waste material is predetermined.

Substantially all of the body portion 61 of the drill tip 60 is hollow as indicated by the dotted line 77 which defines the extent of the hollow regions, this allows air flow from within the shaft portion of the drill bit 13 to flow to the drill tip 60 and may then be expelled through apertures in the front portion of the drill tip. These apertures 78 ensure that the airflow along the drill bit ejects gas in a forwardly extending motion so as to direct waste material drilled from the target by the teeth 75, 76 and 77 in a forward motion. It will be noted that the pilot tip 62 does not have a fully cylindrical body. Rather portions of the pilot body portion are removed to help prevent snagging of the pilot tip as it advances down the pipe and so as to avoid inhibition to the directing gas. The pilot tip could of course be left complete which would only hinder air flow not prevent it.

FIG. 8 illustrates another drill tip in which the outer radius of the pilot tip is greater than that shown in FIG. 7. By modifying the drill tip in this way the drill tip can be modified to be used with varying diameters of pipe pre-existing in a target.

FIG. 9 illustrates how the drill tip 60 connected to shaft portion 63 may be loaded into a seal housing 90 and then advanced towards a target 11. A pipe 51 extends through the target 11 and thus forms part of the target. A further part of a seal formed as a sealing cup 91 may be bolted to the front of the target 11. It will be understood that in certain environments such seals may already be in place. Alternatively a sealing cup may be bolted to the surface of a target as will be understood by those skilled in the art. When embodiments of the present invention are applied in environments in which no hazardous material is involved and thus sealing is not required to prevent contaminated air or waste products reaching a safe area, then the seal housing 90 and sealing cup 91 may be needless. The seal housing 90 includes a forwardly locating ring 92 which locates the seal housing as it is advanced into the cup portion 91. Further seals which may be 'O' rings 93 are provided to seal against the inner walls 94 of the sealing cup 91. A locating pin 95 helps ensure that the seal housing is correctly located with respect to a sealing cup in a final position. Further seals 96 may be provided to seal against the seal housing 90 and the outer surface of the cylindrical shaft portion of the drill bit. In this way once the seal housing is located within the sealing cup 91 as shown in FIG. 10 and thereafter locked in place, the drill bit 13 may be advanced by sliding it forwardly (left to right in FIG. 10) thereby drilling portions of the target out as the drill bit is advanced. As the drill bit is advanced a seal is maintained by virtue of the sealing washers 96 or other sealing members. In this way the outside of the drill tube and extension tube of the shaft 13 pass through the seal housing prior to entering the hole to be drilled.

The seal housing has an air connection 97 which allows compressed air to be supplied to the gap between the shaft tube of the drill bit 13 and the hole being drilled. The air flows towards the drill tip and is allowed to pass through into the existing hole formed by the inner bore of the pipe 51 by virtue of the holes 78 formed in the body portion of the drill tip and the cut-outs in the pilot tip. It will be understood that this supply of directing gas may be used in addition to or replace the use of the directing gas flowing along the inside of the drill bit 13.

Embodiments of the present invention thus provide a method for drilling a bore through a target which includes a pre-existing pipe extending through that target. A drill 12 is arranged on a support and a longitudinal drill bit including a drill tip is held in the drill chuck. The drill may be aligned to accurately drill through the target along the pipe work either by some form of laser guidance system or by the skilled eye of a user. A seal housing is connected to the drill tip and then a mating portion to the seal housing is located on the surface of the target. This may either be an existing sealing cup or may be bolted onto the surface of a target wall. The drill bit is thereafter slowly advanced until the sealing housing seals into a mating sealing cup and then this seal secured by some form of securing pin or bolt. At this point a pilot tip of the drill tip of the drill bit is located within and end potion of the inner bore of the existing pipe. The drill bit is then driven by the drill 12 and the drill bit advanced. As the drill bit is advanced teeth elements on the drill bit cut through both the existing pipe and surrounding material of the target 11 thus removing the pipe material and target material and developing a wider bore through the target. The inner diameter of this new bore is determined by the outer diameter of cutting teeth on the drill bit. As the drill bit is advanced a directing gas is injected to ensure that waste material including cut material from the pipe and target is blown along the direction of advancement of the drill bit (this is in the direction left to right in FIGS. 9 and 10). The directing gas may be injected either at the seal housing itself or along the hollow drill bit. Any combination of this is possible and it will be understood that if directing gas is injected at the seal housing only then the drill shaft need not be hollow. Likewise it will be understood that if air is not supplied via a seal housing some appropriate modification to that housing could be made. By virtue of using a directing gas substantially all waste material is blown along the existing inner bore of the pipe away from the cutting region and may be blown into a further chamber at the end of the pipe away from the cutting region. The gas may also be used to cool the cutting region thus obviating the need for liquid coolant. Liquid coolant for example water, can cause problems subsequent to a drilling operation as it may be hazardous by causing users to slip or may itself become contaminated if used in a hazardous environment. It is well known that the cleaning up of liquid which has been contaminated either by radioactive or biological contaminants is a complex and costly process. Air or other gas on the other hand may be filtered far more conveniently.

Once the whole target has been drilled through it is possible that the drill bit will enter the contaminated region 50. This may make the drill tip and forward portion of the drill bit shaft 63 itself become contaminated. For this reason the drill may be driven backwards to draw the drill bit out of the bore and the connector 66 disconnected. The forward portion of the shaft and drill tip of the drill bit may then be pushed forward into the contaminated room to form further waste material which may be removed by processes and equipment in the hazardous chamber.

It will be understood that whilst the above-referenced embodiments have been described particularly in respect of use in hazardous environments the invention is not limited to use in such circumstances.

It will also be understood that details of the above-mentioned embodiments have been given by way of example only and the present invention is not to be deemed restricted to use of any of these specific details.

The invention claimed is:
1. A method for drilling a bore through a target including a ready made through bore, the method comprising:
  advancing a drill bit into the target along the ready made through bore in a direction of advancement from a region where a drill device arranged to drive the drill bit is located to a further region;
  injecting a directing gas through at least one aperture in the drill bit so that gas ejected therefrom is directed in the direction of advancement; and
  as the bore is drilled, directing substantially all waste material along the ready made through bore in the direction of advancement via the gas to the further region, wherein the waste material is substantially prevented from moving in a direction opposite the direction of advancement.

2. The method as claimed in claim 1 wherein at least one cutting element of the drill bit defines an internal diameter of the bore developed in the target as the bit advances.

3. The method as claimed in claim 2 further comprising:
  providing the ready made bore having an existing diameter less than the internal diameter in the target; and
  directing waste material along the ready made bore during the step of advancing the drill bit.

4. The method as claimed in claim 1 wherein substantially all of the waste material is directed in the direction of advancement.

5. The method as claimed in claim 1 comprising dry drilling.

6. The method as claimed in claim 1 further comprising simultaneously drilling through at least two different materials.

7. The method as claimed in claim 1 wherein the target comprises a wall composed of a first material and a pipe composed of a different material extending through the wall, the internal bore of the pipe defining a ready made bore along which the drill bit is advanced.

8. The method as claimed in claim 1 further comprising:
  selecting the dimensions of the drill tip for providing consistent particle size, having a largest cross-section below a predetermined threshold limit, of ejected waste material.

9. A drill bit for drilling a bore through a target via a drilling process, comprising:
  at least one cutting surface arranged to cut a bore having an internal diameter through the target as the drill bit advances into the target from a region where a drill device arranged to drive the drill bit is located to a further region; and
  at least one aperture in the drill bit for permitting a directing gas to be injected in a direction of advancement of the drill bit to thereby direct substantially all waste material, formed as the bore is drilled, in the direction of advancement to the further region; wherein
  the drill bit further comprises a drill tip including the cutting surface and a shaft portion for connecting the drill tip to a drill device and the at least one aperture is formed radially outwardly in the shaft portion, wherein the at least one aperture in the drill bit is configured to direct gas in the direction of advancement of the drill bit such that the waste material is substantially prevented from moving in a direction opposite the direction of advancement.

10. The drill bit as claimed in claim 9 wherein the cutting surface is arranged for cutting a bore having an internal diameter wider than an existing bore in the target and along which the drill bit is advanced.

11. The drill bit as claimed in claim 9 further comprising a pilot tip, having an outer diameter arranged to closely match an internal diameter of a ready made bore formed in the target, extending from a body portion of the drill bit.

12. The drill bit as claimed in claim 11 wherein the pilot tip is disposed at a forward end region of the body portion of the drill bit.

13. The drill bit as claimed in claim 9 further comprising at least one chip breaker tip disposed at a forward region of a body portion of the drill bit.

14. The drill bit as claimed in claim 9 further comprising:
at least one air passage extending longitudinally through the drill bit for providing a route for gas to flow along from a rear portion of the drill bit to the at least one aperture.

15. The drill bit as claimed in claim 9 wherein the shaft portion comprises a cylindrical shell body portion and includes at least one further aperture therein, for providing a route for gas to flow from an internal region of the cylindrical shell to an external region formed between the outer diameter of the cylindrical shell and the inner diameter of the drilled bore.

16. The drill bit as claimed in claim 9 further comprising:
connecting means on at least one of a rear portion of the drill tip and/or a forward region of the shaft portion for securely connecting the tip and shaft portion together.

17. A drill, for use with a drill bit arranged for drilling a bore through a target, comprising:
a drill bit comprising:
at least one cutting surface arranged to cut a bore having an internal diameter through the target as the drill bit advances into the target from a region where a drill device arranged to drive the drill bit is located to a further region; and
at least one aperture in the drill bit for permitting a directing gas to be injected in a direction of advancement of the drill bit to thereby direct substantially all waste material, formed as the bore is drilled, in the direction of advancement to the further region; wherein
the drill bit further comprises a drill tip including the cutting surface and a shaft portion for connecting the drill tip to a drill device and the at least one aperture is formed radially outwardly in the shaft portion;
a rotor shaft arranged to rotate when driven;
a motor arranged to drive the shaft;
connection means for connecting the drill bit to the rotor shaft;
a gas inlet arranged to receive pressurised gas from a pressurised gas source; and
gas directing means arranged to inject gas from the inlet to the drill bit thereby providing a directing gas flow in a direction of advancement as the drill bit drills the bore, wherein the at least one aperture in the drill bit is configured to direct gas in the direction of advancement of the drill bit such that the waste material is substantially prevented from moving in a direction opposite the direction of advancement.

* * * * *